United States Patent [19]
Lawson

[11] Patent Number: 5,626,052
[45] Date of Patent: May 6, 1997

[54] SMART FUEL TANK MODULE

[75] Inventor: John C. Lawson, Ortonville, Mich.

[73] Assignee: Chrysler Corporation, Auburn Hills, Mich.

[21] Appl. No.: 470,687

[22] Filed: Jun. 6, 1995

Related U.S. Application Data

[62] Division of Ser. No. 185,336, Jan. 24, 1994.

[51] Int. Cl.$^6$ ........................................... G01F 23/26
[52] U.S. Cl. ............................................. 73/304 C
[58] Field of Search ................................ 73/304 C

[56] References Cited

U.S. PATENT DOCUMENTS

| | | | |
|---|---|---|---|
| 4,806,847 | 2/1989 | Atherton et al. | 73/304 C |
| 4,888,989 | 12/1989 | Homer | 73/304 C |

*Primary Examiner*—William A. Cuchlinski, Jr.
*Assistant Examiner*—Willie Morris Worth
*Attorney, Agent, or Firm*—Margaret A. Dobrowitsky

[57] ABSTRACT

An apparatus and method is provided for detecting the level, composition, and temperature of a liquid fuel stored in a tank on a vehicle, as well as the tank pressure, and for transmitting this data via a multiplex bus to a central vehicle computer. The apparatus for collecting liquid fuel level data comprises first capacitive sensing means located within the fuel tank for storing a charge proportional to a full liquid level, second capacitive sensing means located within the tank for storing an instant liquid level charge proportional to the instant liquid level in the tank, and first processing means in communication with the multiplex bus and first and second capacitive sensing means for comparing the full liquid level charge to the instant liquid level charge to determine an absolute liquid level value and for outputting a corresponding fuel level data signal to the multiplex bus. The inventive method for collecting liquid level data comprises the steps of charging first and second capacitive sensors, discharging the first capacitive sensor through a resistive member and recording the discharge time as a first clock count representing the full-tank liquid level, discharging the second capacitive sensor through a resistive member and recording the discharge time as a second clock count representing an instant liquid level, then comparing the instant liquid level to the full-tank liquid level to determine an absolute liquid level in the tank.

6 Claims, 3 Drawing Sheets

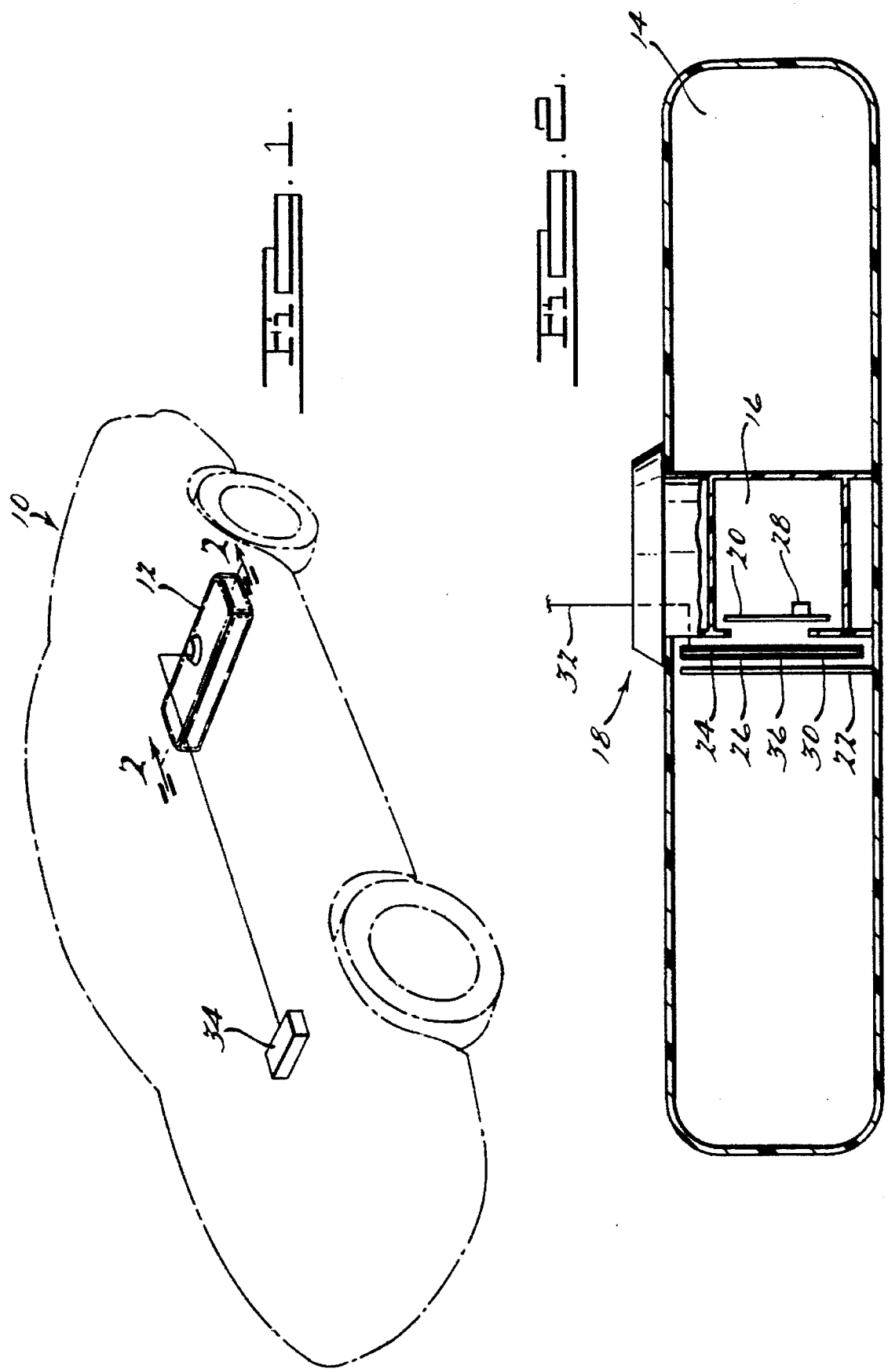

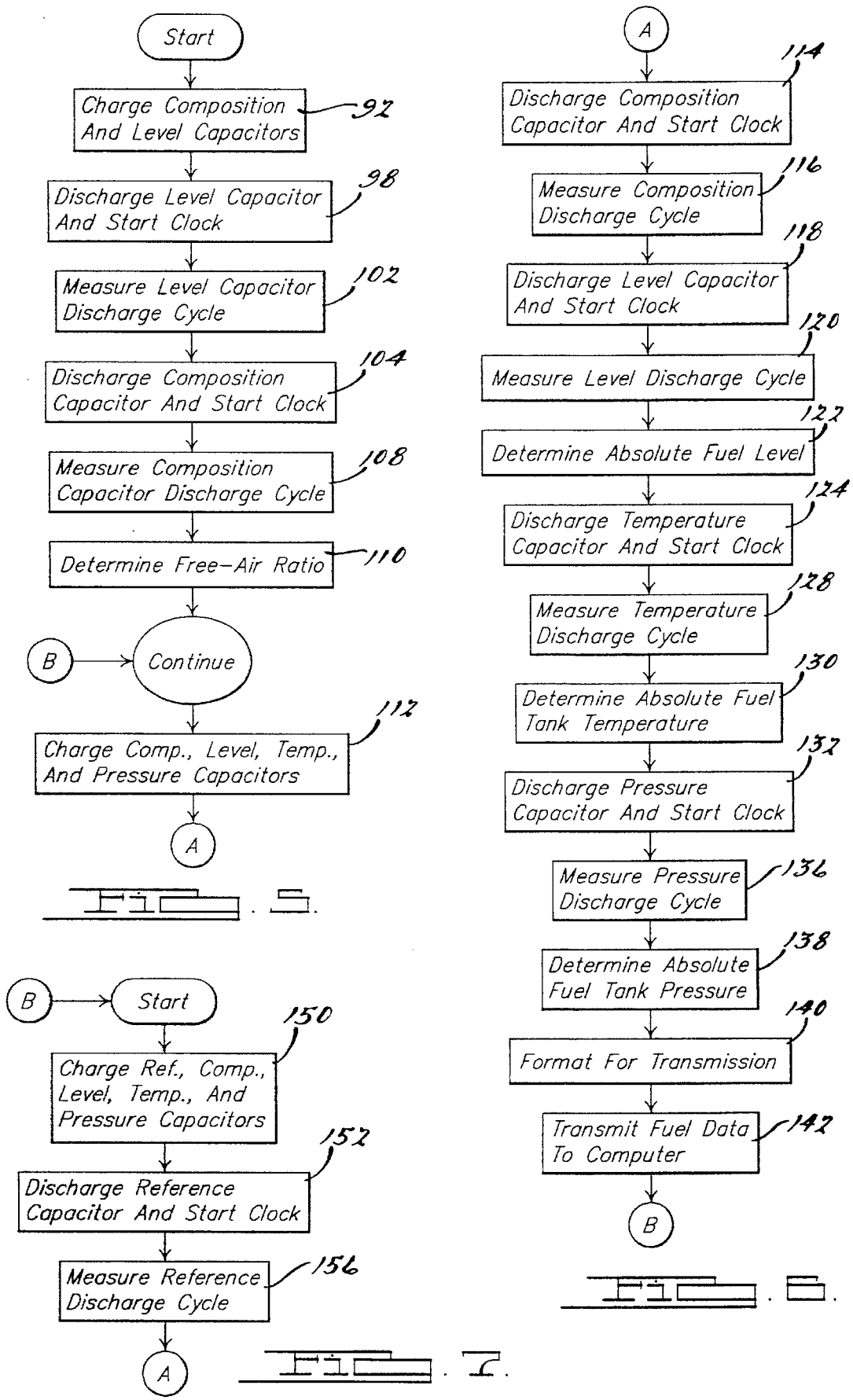

SMART FUEL TANK MODULE

CROSS-REFERENCE TO RELATED APPLICATIONS

This application is a division of pending application Ser. No. 08/185,336, filed Jan. 24, 1994 by the same inventor as in the present application.

FIELD OF THE INVENTION

The present invention relates to an apparatus and method for detecting the level, composition, and temperature of a liquid fuel stored in a tank on a vehicle, as well as the tank pressure, and for transmitting this data via a multiplex bus to a central vehicle computer.

BACKGROUND

It is known that fuel level and composition information can be collected from a combination of capacitors located inside a fuel tank. The capacitance of a capacitor immersed in a fluid is proportional to the dielectric constant of the fluid times the capacitor's free air capacitance according to the following equation:

$$C_f = \epsilon \times C_a \quad (1)$$

where:

$C_f$=capacitance (pF) of capacitor C immersed in fluid
$\epsilon$=dielectric constant of the fluid in the tank
$C_a$=capacitance (pF) of capacitor C in free air A method for sensing the level of a fluid in a fuel tank can be derived using equation (1) and the measured value of the capacitance developed on a partially immersed capacitor in a fluid of a known dielectric value. For example, U.S. Pat. No. 5,051,921, issued Sep. 24, 1991 to Paglione, describes such a method which uses interdigitated capacitors immersed in fluid contained in a fuel tank to sense the level of the fluid.

Using capacitive fuel gauges to detect the level of a fluid other than pure gasoline however, creates a problem since most capacitive fuel gauges are calibrated according to the dielectric properties of pure gasoline. An output signal from a capacitive fuel gauge immersed in a mixture of fuel ingredients, e.g. a mixture of gasoline and methanol or ethanol, registers a false reading if the gauge was calibrated to sense the level of pure gasoline since the gasoline mixture has a dielectric constant different from that of pure gasoline.

The method of the '921 patent addresses the capacitive fuel gauge calibration problem by first recognizing that the level of any fluid in a tank can be calculated according to the following equation:

$$C_f = C_a + (C_a/L)[H(\epsilon - 1)] \quad (2)$$

where:

$C_f$=capacitance (pF) of capacitor C immersed in fluid
$\epsilon$=dielectric constant of the fluid in the tank
$C_a$=capacitance (pF) of capacitor C in free air
L=total length (inches) of capacitor C
H=height (inches) of the fluid in the tank As described in the '921 patent, $C_f$, $C_a$, L are known quantities. $\epsilon$ is determined using equation (1) and measured capacitance values obtained from a capacitor immersed in the fuel. The value of each of these parameters is substituted into equation (2) to determine H as follows:

$$H \approx \frac{L[(C_f/C_a) - 1)]}{(\epsilon - 1)} \quad (3)$$

The fuel level detection scheme disclosed in the '921 patent utilizes two capacitors connected to a monostable multivibrator, also known in the art as a "one-shot," and an oscillator or clock. The monostable multivibrator modifies the width or duration of output pulses from the oscillator or clock in proportion to the capacitance of each capacitor. The output of the first capacitor, directly proportional to the dielectric constant or composition of the fluid in the tank as indicated by equation (1), is called the composition signal. The output of the second capacitor, directly proportional to the level of the fluid in the fuel tank as indicated in equation (2), is called the level signal. An analog processor multiplies the level and composition signals together to obtain a fuel level signal which incorporates the correct dielectric constant of the fuel mixture. Thus, a signal is produced which always represents the correct fluid level regardless of fuel composition.

Although the method described in the '921 patent solves the problem of obtaining an accurate fluid level reading for mixtures other than pure gasoline from fuel gauges calibrated according to the dielectric constants of pure gasoline, it employs expensive components such as multi-vibrators, an external comparator, multiple low pass filters and an analog math co-processors which make the '921 method too expensive for use in production vehicles.

In addition, the method disclosed in the '921 patent proves disadvantageous due to the location of the composition capacitor at the bottom of the fuel tank. Water and contaminating particles inevitably find their way to the bottom of the. The accumulation of pollutants tends to corrupt the capacitor changing the amount of charge that the capacitor stores which results in inaccurate readings.

Furthermore, the '921 patent does not provide for free-air calibration of the fuel gauge before the unit is submersed in the fluid making the '921 device very sensitive to the manufacturing tolerances of the various component parts.

Moreover, the multiple sensors used to sense level and composition data have traditionally been connected to their individual displays using individual wires. The individual wires have either been banded together into a wiring harness that exits the fuel tank through a relatively large opening or each wire has been routed out of fuel tank individually through one of many openings in the fuel tank. Using a scheme that integrates the various output data signals onto a single wire for transmission to a central vehicle computer via a multiplex bus reduces the number of openings in the fuel tank through which harmful emissions can emanate.

Finally, integration of the various functions into one fuel gauge assembly eliminates redundant subsystem components, such as multiple controllers, resulting in a significant reduction in the cost of the fuel gauge assembly and in its complexity which, in turn, facilitates the manufacturing process.

SUMMARY OF THE INVENTION

Thus an object of that present invention is to develop an improved fuel level sensing system that provides accurate fuel level, composition, and temperature information, as well as tank pressure data, and transmits this fuel and tank data to a central vehicle computer via a multiplex bus system.

In accordance with this objective, a first embodiment of the present invention provides an apparatus for collecting liquid fuel level data having first capacitive sensing means located within the fuel tank for storing a charge proportional to a full liquid level, second capacitive sensing means located within the tank for storing an instant liquid level charge proportional to the instant liquid level in the tank, and first processing means in communication with the multiplex bus and first and second capacitive sensing means for comparing the full liquid level charge to the instant liquid level charge to determine an absolute liquid level value and outputting a corresponding fuel level data signal to the multiplex bus.

The object of the invention is also achieved through an inventive method for collecting liquid level data comprising the steps of charging first and second capacitive sensors, discharging the first capacitive sensor through a resistive member and recording the discharge time as a first clock count representing the full-tank liquid level, discharging the second capacitive sensor through the same resistive member and recording the discharge time as a second clock count representing an instant liquid level, and comparing the instant liquid level to the full-tank liquid level to determine an absolute liquid level in the tank.

Collection of liquid temperature data is achieved through an apparatus having resistive temperature sensing means that provides a first temperature data signal proportional to the liquid temperature, capacitive storage means for storing a charge proportional to the temperature data signal and providing a second temperature data signal proportional to the first temperature data signal, and processing means for comparing the second temperature data signal to stored values and providing an absolute temperature signal to the multiplex bus.

Collection of tank pressure data is achieved through an apparatus having analog pressure transducer means that produces a first pressure data signal, capacitive storage means that stores a charge proportional to the output of the transducer means and produces a second pressure data signal, and processing means for comparing the second pressure data signal to stored values and providing an absolute pressure signal to the multiplex bus.

Other features and advantages of the invention will become apparent from following detailed description of the preferred embodiment, the claims, and the drawings.

BRIEF DESCRIPTION OF THE DRAWINGS

FIG. 1 is a perspective view of a vehicle showing a multiplex bus running from the fuel tank to the vehicle's central computer.

FIG. 2 is cross-sectional side view of the fuel tank showing the location of the Smart Fuel Tank Module and the sensors.

FIG. 5 is a block diagram representing the method of operation of the first embodiment, the factory free-air calibration configuration, of the Smart Fuel Tank Module shown in FIG. 3.

FIG. 6 is a block diagram representing the method of operation of the Smart Fuel Tank Module.

FIG. 7 is a block diagram representing the method of operation for the second embodiment, the reference capacitor base-line calibration configuration, of the Smart Fuel Tank Module as shown in FIG. 4.

DETAILED DESCRIPTION OF THE PREFERRED EMBODIMENT

Figure 3:
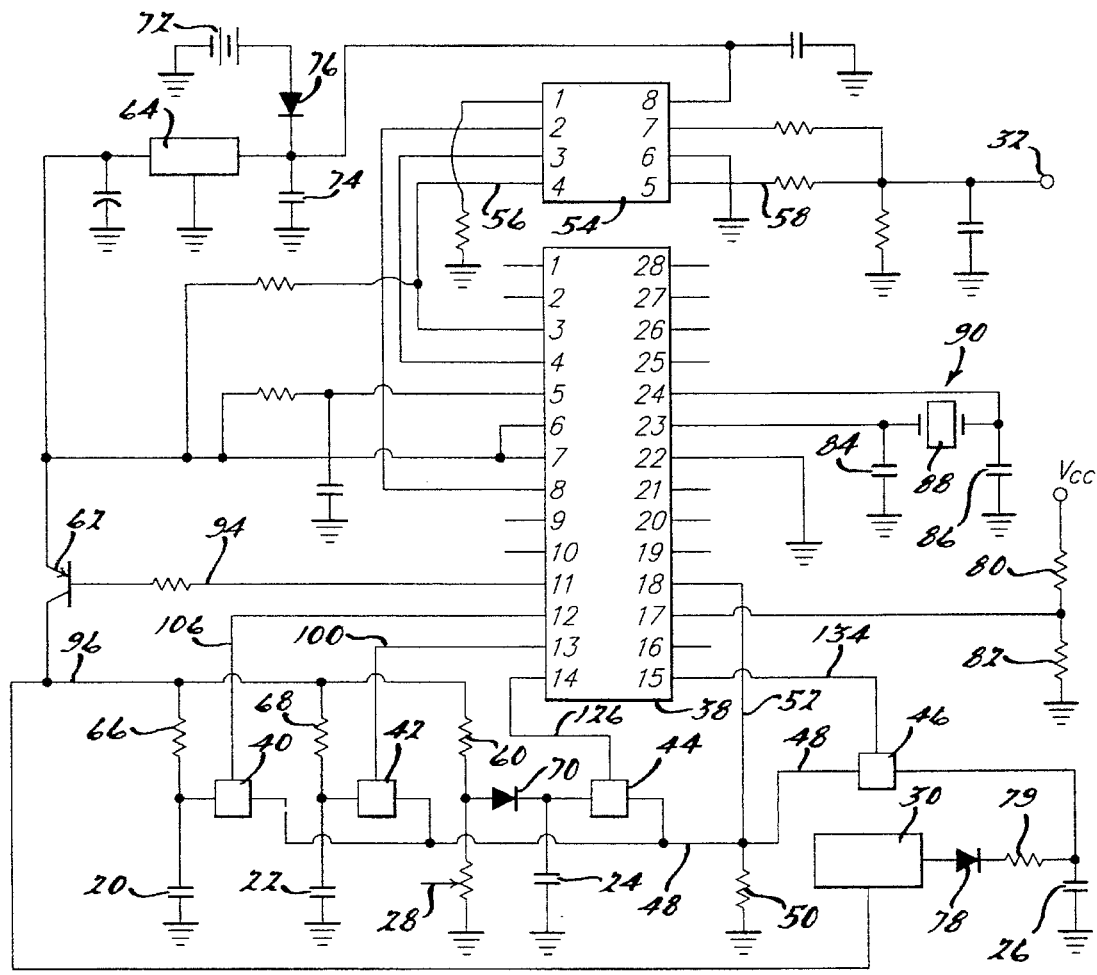
FIG. 3 is a schematic representation of a first embodiment of the Smart Fuel Tank Module configured for factory free-air calibration.

Referring now to the drawings wherein like reference numerals represent the same components among the several drawings, FIGS. 1 and 2 depict an automotive vehicle 10 having a fuel tank 12 with a main compartment 14 and a reserve compartment 16. Data concerning the fuel and its environment in the fuel tank 12 is gathered by the present invention, the Smart Fuel Tank Module 18, using four capacitors 20, 22, 24, and 26, a negative temperature coefficient resistor (NTC) 28, and a pressure transducer 30. A multiplex bus 32 connects the Smart Fuel Tank Module 18 with the central vehicle computer 34.

As shown in FIG. 2, the composition capacitor 20 and the NTC 28 are located in the reserve compartment 16 of the fuel tank 12. The temperature capacitor 24 and pressure capacitor 26 are located on a printed circuit board 36 in the main compartment 14 of the fuel tank 12. Also located on the printed circuit board 36 is the analog pressure transducer 30.

Referring now to the schematic of FIG. 3, the composition capacitor 20, level capacitor 22, temperature capacitor 24, and pressure capacitor 26 are each connected to a special function micro-controller 38 through a logic gate 40, 42, 44, and 46, respectively, which behaves as a single pole, single throw (SPST) switch. The logic gates 40, 42, 44 and 46 are each connected through a line 48 to a common discharge resistor 50 whose voltage is monitored by the micro-controller 38 through a line 52.

The special function micro-controller 38, developed by Chrysler Corporation, is disclosed in U.S. patent application Ser. No. 07/871,259 entitled "Automatic Multiplex Data Link System Symbol Encoder Decoder Therefor" filed on Apr. 20, 1992 by Halter et al. and allowed on Jun. 29, 1993.

The input/output (i/o) driver 54 is connected through a line 56 to the micro-controller 38 and to the multiplex bus 32 through a line 58. The i/o driver 54 is used by the micro-controller 38 to transmit fuel level, composition, temperature, and internal fuel tank pressure data gathered using the capacitors 20, 22, 24 and 26 to the central vehicle computer 34 (not shown in FIG. 3). All of the fuel tank data, or any part thereof, is transmitted by the i/o driver 54 to the central vehicle computer 34, or to another appropriate computer processing unit, via the multiplex bus 32. The i/o driver 54, also developed by Chrysler Corporation, is disclosed in U.S. patent application Ser. No. 07/951,989 entitled "Vehicle Communications Network Transceiver, Ground Translation Circuit Therefore" filed on Sep. 28, 1992 by Hormel et al.; U.S. patent application Ser. No. 07/951,988 entitled "Vehicle Communications Network Transceiver, Transmitter Circuit Therefore" filed on Sep. 28, 1992 by Hormel; and U.S. patent application Ser. No. 07/988,321 entitled "Vehicle Communications Network Transceiver, Bus Driver Therefore" filed on Nov. 27, 1992 by Hormel, which disclosures are incorporated herein by reference.

The composition capacitor 20, level capacitor 22, and a first voltage divider comprised of a temperature resistor 60 and the NTC 28, are connected in parallel through a switching transistor 62 to a voltage regulator 64, which preferably supplies a constant 5 Volt DC voltage. In addition, the precision composition resistor 66 and the level resistor 68 are connected in series with the composition capacitor 20 and the level capacitor 22 to form first and second RC combinations 20,66 and 22,68, respectively. The voltage regulator 64 charges the composition capacitor 20 and the level capacitor 22 when the switching transistor 62 is turned on.

The output voltage of the voltage regulator 64 is divided by the first voltage divider 60,28. The divided voltage is applied through a temperature diode 70 to charge the temperature capacitor 24 when the switching transistor 62 is turned on. The temperature diode 70 prevents the temperature capacitor 24 from discharging through the NTC 28.

The resistance of the NTC 28 is dependent on the fuel temperature. Because the NTC 28 is directly connected to the temperature capacitor 24 through the temperature diode 70, the charge on the temperature capacitor 24 is also made dependent on the fuel temperature.

The voltage regulator 64 is connected to the vehicle battery 72 through a filter capacitor 74, preferably 1uF, which removes noise present in the current supplied to the voltage regulator 64 from the source vehicle battery 72. A polarity protector diode 76, preferably a 1N4004, located between the vehicle battery 72 and the voltage regulator 64 protects the circuitry on the printed circuit board 36 from any back current generated in the event that the polarity of the vehicle battery 72 is reversed.

The pressure transducer 30 is connected to the pressure capacitor 26 through a series connection of the pressure diode 78 and the pressure resistor 79. The pressure capacitor 26 is also connected to the discharge resistor 50 through the pressure logic gate 46 via the line 48 which the micro-controller 38 monitors using the line 52.

A second voltage divider is formed by a first comparator resistor 80 and a second comparator resistor 82, preferably 5.1K and 1K respectively. The second voltage divider 80,82 is physically located on the printed circuit board 36.

The composition capacitor 20 and the level capacitor 22 are preferably equal but variable capacitors with a range of approximately 12 pF in free air to 20 pF when fully immersed in a fuel mixture. Alternatively, the capacitances of the composition capacitor 20 and the level capacitor 22 can be of unequal value if the software running within the micro-controller 38 compensates for this difference in capacitance as described in the preferred method of operation given below.

The capacitance of the temperature capacitor 24 and the pressure capacitor 26 are specified such that the second voltage divider 80,82 can be used to obtain fuel temperature and fuel tank pressure data according to the method of operation given below. In the preferred embodiment, the value of the temperature capacitor 24 and the pressure capacitor 26 is preferably 12 pF.

The voltage developed at the intermediate node of the second voltage divider 80,82 is used by the micro-controller 38 as a reference or threshold voltage against which the internal comparator of the micro-controller 38 compares the instant voltage generated across the discharge resistor 50 as the composition capacitor 20, level capacitor 22, temperature capacitor 24, and pressure capacitor 26 discharge.

Also connected to the micro-controller 38 are first and second clock capacitors 84 and 86, respectively, as well as the oscillator 88. The capacitance of the first and second clock capacitors 84 and 86 is preferably 22 pF each. The frequency of the oscillator 88 is preferably 10 MHz. When combined with circuitry internal to the micro-controller 38 and first and second clock capacitors 84,86, the oscillator 88 forms a functional clock 90. The clock 90 is used by the micro-controller 38 to establish the discharge rate for each of the capacitors 20, 22, 24, and 26 once the respective logic gate 40, 42, 44 or 46 has been enabled. The discharge cycle for each capacitor 20, 22, 24, and 26 is determined as the number of clock cycles counted by the micro-controller 38 as the capacitor 20, 22, 24 or 26 discharges across the discharge resistor 50. To determine a discharge cycle, the micro-controller 38 compares the threshold voltage at the node of the second voltage divider 80,82 with the instant voltage across the discharge resistor 50. The amount of time that the instant voltage is greater than, or equal to, the threshold voltage is recorded by the micro-controller 38 as that capacitor's 20, 22, 24 or 26 discharge cycle.

In the preferred method, the Smart Fuel Tank Module 18 is self-calibrated to compensate for any variation in the manufacturing tolerances of the component parts and to acquire empty fuel tank data. Preferably, self-calibration is performed once, before the Smart Fuel Tank Module 18 is submersed in fuel or at a time when the fuel tank 12 is empty such as while the vehicle 10 is still on the assembly line.

The preferred calibration method for the first embodiment of the Smart Fuel Tank Module 18 depicted in FIG. 3 is outlined in the flow diagram of FIG. 5. In step 92, the switching transistor 62 is turned on by the micro-controller 38 holding the line 94 low thereby causing the output voltage of the voltage regulator 64 to be transmitted through a line 96 to the common node of the RC series combinations 20,66; 22,68 and 26,79. A full charge corresponding to a potential difference of 5 V is thus developed across the composition capacitor 20 and the level capacitor 22.

In step 98, the level logic gate 42 is selected by the micro-controller 38 using a line 100 thereby discharging the level capacitor 22 along the line 48 and across the discharge resistor 50. At the same time, the micro-controller 38 begins a count using the clock 90 while continuing to monitor the voltage across the discharge resistor 50 using a line 52. In step 102, when the voltage across the discharge resistor 50 drops below the threshold voltage established by the second voltage divider 80,82, the clock count is stored as the level capacitor clock count in the micro-controller 38. This clock count corresponds to the discharge cycle of the level capacitor 22 in an "free-air," a value which correlates to the capacitance of level capacitor 22 for an empty fuel tank reading. The level capacitor's free-air discharge cycle time is transmitted across the multiplex bus 32 and stored in an available non-volatile memory location in the central vehicle computer 34.

In step 104, the composition logic gate 40 is selected by the micro-controller 38 using a line 106 thereby discharging the composition capacitor 20 along the line 48 and across the discharge resistor 50. At the same time, the micro-controller 38 begins a count using the clock 90 while continuing to monitor the voltage across the discharge resistor 50 using a line 52. In step 108, when the voltage across the discharge resistor 50 drops below the threshold voltage established by the second voltage divider 80,82, the clock count is stored as the composition capacitor clock count in the micro-controller 38. The composition capacitor clock count corresponds to the discharge cycle of the composition capacitor in an empty fuel tank, a value which correlates to the actual capacitance value of the composition capacitor 20 in "free-air."

In step 110, the capacitance values of the level capacitor 20 and the composition capacitor 22 are compared to determine a free-air ratio, F, according to the following expression:

$$F = C_{22F}/C_{20F} \tag{4}$$

where:

$C_{22F}$=capacitance of the level capacitor 22 in free air or at empty fuel tank $C_{20F}$=capacitance of the composition capacitor 20 in free air or at empty fuel tank The free-air ratio, F, is used as a factor by the micro-controller 38, in step 122 below, to adjust the measured capacitance value of the composition capacitor 20 according to the differential between the capacitive values of the composition capacitor 20 and the level capacitor 22. This capacitive differential is the result of the manufacturing variances of capacitors designated to have nominally the same capacitive value. The free-air ratio provides a means to adjust the value of the composition capacitor 20 in step 122 below to ensure that more accurate fuel level data is derived from measurements of the level capacitor 22.

In step 112, the switching transistor 62 is turned on by the micro-controller 38 holding the line 94 low thereby causing the output voltage of the voltage regulator 64 to be transmitted through a line 96 to the common node of the RC series combinations 20,66 and 22,68 and to intermediate node of the first voltage divider 60,28. A full charge corresponding to a potential difference of 5 V is thus developed across the composition capacitor 20 and the level capacitor 22. At the same time, a divided voltage dependent on the selected value of the NTC 28 also is developed across the temperature capacitor 24. A voltage dependent on the output voltage of the pressure transducer 30 is also developed across the pressure capacitor 26.

Referring now to FIG. 6, the composition logic gate 40 is selected in step 114 by the micro-controller 38 using a line 106 thereby discharging the composition capacitor 20 along the line 48 and across the discharge resistor 50. At the same time, the micro-controller 38 begins a count using the clock 90 while continuing to monitor the voltage across the discharge resistor 50 using a line 52. In step 116, when the voltage across the discharge resistor 50 drops below the threshold voltage established by the second voltage divider 80,82, the clock count is stored as the composition capacitor clock count in the micro-controller 38. The composition capacitor clock count corresponds to a full fuel tank level. In addition, a software look-up table can be utilized by the micro-controller 38 to identify the composition of the fuel. The look-up table cross-references the dielectric properties of a fuel mixture versus the discharge cycle of the composition capacitor 20 thus enabling the Smart Fuel Tank Module 18 to advantageously provide fuel level data for any fuel composition.

In step 118, the level logic gate 42 is selected or activated by the micro-controller 38 using a line 100 thereby discharging the level capacitor 22 along the line 48 and across the discharge resistor 50. At the same time, the micro-controller 38 begins a clock count using the clock 90 while continuing to monitor the voltage across the discharge resistor 50 using a line 52. In step 120, when the voltage across the discharge resistor 50 drops below the threshold voltage established by the second voltage divider 80,82, the clock count is stored as the level capacitor clock count in the micro-controller 38.

In step 122, the absolute fuel level is calculated according to the expression:

$$\frac{(C_{20} - C_{22f}) - [(F * C_{20}) - C_{22\nu}]}{(C_{20} - C_{22f})} = B \quad (5)$$

where, for a particular fuel mixture:

$C_{20}$=the max capacitance of composition capacitor 20, i.e., when the fuel tank is full $C_{22f}$=the minimum capacitance of level capacitor 22 in free air, i.e., when the fuel tank is empty $C_{22\nu}$=the variable capacitance of level capacitor 22, i.e., when level capacitor 22 is partially immersed in fuel F=free air ratio or $C_{22f}/C_{20f}$ B=fractional volume of fuel remaining in the fuel tank.

A fuel level data signal corresponding to the fractional volume of fuel remaining in the fuel tank is then output to the multiplex bus. As seen in the expression above which is independent of the dielectric constant of the fuel, the Smart Fuel Tank Module 18 can advantageously determine the absolute fuel level of any mixture of fuels without a look-up table listing particular dielectric constants corresponding to specific fuel mixtures.

In step 124, temperature data is collected by the micro-controller 38 using the temperature capacitor 24. The temperature logic gate 44 is selected by the micro-controller 38 using a line 126 enabling the temperature capacitor 24 to discharge through the temperature logic gate 44 and across the discharge resistor 50. At the same time, the micro-controller 38 begins a clock count using the clock 90 while continuing to monitor the voltage across the discharge resistor 50 using the line 52. In step 128, when the voltage across the discharge resistor 50 drops below the threshold voltage established by the second voltage divider 80,82, the clock count is stored as the temperature capacitor clock count in the micro-controller 38 and corresponds to the temperature of the fuel in the fuel tank 12. In step 130, the micro-controller 38 determines the absolute fuel tank temperature by consulting a look-up table that cross-references temperature capacitor clock counts versus fuel temperature values.

In step 132, pressure data is collected by the micro-controller 38 using the pressure capacitor 26. The pressure logic gate 46 is selected by the micro-controller 38 using a line 134 discharging the pressure capacitor 26 back along the line 48 through the discharge resistor 50. In step 136, when the voltage across the discharge resistor 50 drops below the threshold voltage established at the intermediate node of the second voltage divider 80,82, the clock count is stored as the pressure clock count in the micro-controller 38. The pressure clock count corresponds to the pressure inside the fuel tank 12. In step 138, micro-controller 38 determines the absolute fuel tank pressure by consulting a look-up table cross-referencing pressure capacitor clock counts versus fuel tank pressure values.

In step 140, the fuel level, composition, temperature, and pressure data collected is converted by the micro-controller 38 into the message format required for transmission to the central vehicle computer 34. Finally, in step 142, the converted or formatted data is transmitted by the micro-controller 38 to the central vehicle computer 34 under the control of the i/o driver 54 via the multiplex bus 32.

Figure 4:
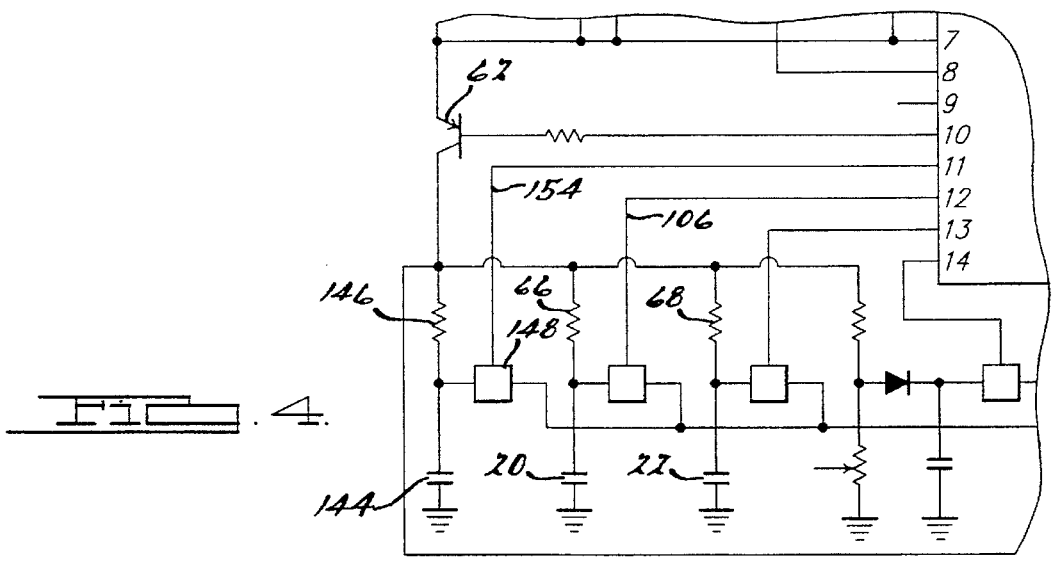
FIG. 4 is a partial schematic representation of a second embodiment of the Smart Fuel Tank Module configured for reference capacitor base-line calibration.

A second embodiment of the Smart Fuel Tank Module 18 is schematically depicted in FIG. 4. In this second or alternative embodiment, a reference capacitor 144 is added to the Smart Fuel Tank Module 18 configuration depicted in FIG. 3. The addition of the reference capacitor 144 eliminates the need perform the factory free-air calibration steps outlined in FIG. 5. A reference resistor 146 is connected in series to reference capacitor 144 to form a third RC combination 144,146. The third RC combination 144,146 is connected in parallel with the first and second RC combinations 20,66 and 22,68 through the switching transistor 62 to the voltage regulator 64. The reference capacitor 144 is connected to the micro-controller 38 through a reference logic gate 148 which behaves as a SPST.

The reference capacitor 144 is physically located on the printed circuit board 36 in the main compartment 14 of the fuel tank 12. The reference capacitor 144 is a discrete capacitor having a set capacitive value of preferably 12 pF, a value nominally corresponding to the free-air value of both the variable composition capacitor 20 and the variable level capacitor 22. The value of the reference capacitor 144 provides a free-air capacitance reference value to which the value of the level capacitor 22 can be compared at any time to determine whether the fuel tank 12 is empty.

The second or alternative method of operation utilizing the reference capacitor 144 is depicted in the flow diagram of FIG. 7. In step 150, the micro-controller 38 turns on the switching transistor 62 by holding the line 106 low causing the output voltage of the voltage regulator 64 to be transmitted through the line 96 to the common node of the RC series combinations 20,66; 22,68; 26,79 and 144,146. A full charge corresponding to a potential difference of 5 V is thus developed across the composition capacitor 20, level capacitor 22, and reference capacitor 144.

In step 152, the reference logic gate 148 is selected by micro-controller 38 using a line 154 thereby discharging the reference capacitor 144 along the line 48 and across the discharge resistor 50. At the same time, the micro-controller 38 begins a clock count using the clock 90 while continuing to monitor the voltage across the discharge resistor 50 using the line 52. In step 156, when the voltage across the discharge resistor 50 drops below the threshold voltage established by the second voltage divider 80,82, the clock count is stored as the reference capacitor clock count in the micro-controller 38.

In step 122 of FIG. 6, the absolute fuel level is calculated for the second or alternative embodiment of the Smart Fuel Tank Module 18 depicted FIGS. 4 and 7 according to the alternative expression:

$$\frac{(C_{20} - C_{144}) - [C_{20} - C_{22v}]}{(C_{20} - C_{144})} = B \quad (6)$$

where, for any fuel mixture:

$C_{20}$=the max capacitance of composition capacitor 20, i.e., when the fuel tank is full $C_{144}$=the capacitance of reference capacitor 144 in free air, i.e., when the fuel tank is empty $C_{22v}$=the variable capacitance of level capacitor 22, i.e., when level capacitor 22 is partially immersed in fuel B=fractional volume of fuel remaining in the fuel tank.

In the second or alternative embodiment of the Smart Fuel Tank Module 18, the capacitive ranges of the composition capacitor 20 and the level capacitor 22 are equal to each other and to the reference capacitor 144. Therefore, the reference capacitor 144 can be utilized conveniently by the micro-controller 38 to determine whether the absolute fuel level has fallen to the level of an empty fuel tank. As can be seen from equation (6), the second or alternative method advantageously provides fuel level data independent of fuel composition. As a result, no look-up table cross-referencing various fuel compositions to their dielectric constants need be provided. While the present invention has been disclosed in terms of the preferred embodiments thereof, one skilled in the art should understand that a variation made to any of the disclosed embodiments may still properly fall within the scope of the present invention as defined by the claims that follow.

What is claimed is:

1. A method for collecting liquid level data from at least two capacitive sensors and a resistive member located within a storage tank in a vehicle, wherein a first capacitive sensor is disposed so as to be always immersed in a liquid within said storage tank, and a second capacitive sensor is disposed so as to be exposed to a changing liquid level within stud storage tank, comprising the steps of:

(a) charging said first and second capacitive sensors;
   (b) discharging said first capacitive sensor through a resistive member and recording the discharge time as a first clock count representing a full-tank liquid level;
   (c) discharging said second capacitive sensor through said resistive member and recording the discharge time as a second clock count representing an instant liquid level; and determining absolute liquid level data representative of the fractional volume of fuel remaining in said tank using said first and second clock counts.

2. The method of claim 1, further comprising the step of:
   transmitting said absolute liquid level data in said tank across a multiplex bus.

3. A method for collecting liquid level data from at least three capacitive sensors and a resistive member located within a storage tank in a vehicle, wherein a first capacitive sensor is disposed so as to be always immersed in a liquid within said storage tank, a second capacitive sensor is disposed so as to be exposed to a changing liquid level within said storage tank, and a third capacitive sensor is provided having a fixed capacitance corresponding to the free air capacitance of said first and second capacitive sensors, comprising the steps of:

(a) charging first, second, and third capacitive sensors;
   (b) discharging said first capacitive sensor through said resistive member and recording the discharge time as a first liquid level clock count representing a full-tank liquid level;
   (c) discharging said second capacitive sensor to discharge through said resistive member and recording the discharge time as a second liquid level clock count representing an instant liquid level;
   (d) discharging said third capacitive sensor to discharge through said resistive member and recording the discharge time as a third liquid level clock count representing an empty-tank liquid level; and
   (e) determining absolute liquid level data representative of the fractional volume of fuel remaining in said tank using said first, second and third clock counts.

4. The method according to claim 3, further comprising the step of:
   transmitting said absolute liquid level data in said tank across a multiplex bus.

5. The method of claim 1, further comprising the step of:
   comparing said recorded first clock count obtained from said first capacitive sensor with a look-up table to determine fuel composition data.

6. The method of claim 5, further comprising the step of transmitting said fuel composition data on a multiplex data bus.

* * * * *